United States Patent [19]

Amma

[11] 4,002,408
[45] Jan. 11, 1977

[54] SYSTEM AND DEVICE FOR OVERHEAD PROJECTION

[75] Inventor: Michito Amma, Tokyo, Japan
[73] Assignee: Gakken Co., Ltd., Tokyo, Japan
[22] Filed: Dec. 10, 1971
[21] Appl. No.: 205,832
[52] U.S. Cl. .............................. 353/70; 353/DIG. 3
[51] Int. Cl.² ........................................ B03B 21/00
[58] Field of Search ................... 353/69, 70, 98, 99

[56] References Cited

UNITED STATES PATENTS

| | | | |
|---|---|---|---|
| 1,199,460 | 9/1916 | Featherstone | 353/70 |
| 1,291,274 | 1/1919 | Vebelmesser | 353/70 |
| 1,952,522 | 3/1934 | Warmisham | 353/70 |
| 2,699,704 | 1/1955 | Fitzgerald | 353/79 |
| 2,795,996 | 6/1957 | Sauer | 353/70 |
| 3,051,041 | 8/1962 | Lehmann et al. | 353/99 |
| 3,212,398 | 10/1965 | Miller | 353/70 |
| 3,547,530 | 12/1970 | Poole | 353/70 |

FOREIGN PATENTS OR APPLICATIONS

| | | | |
|---|---|---|---|
| 548,587 | 4/1932 | Germany | 353/70 |
| 1,216,581 | 12/1970 | United Kingdom | 353/98 |

*Primary Examiner*—Harry N. Haroian
*Attorney, Agent, or Firm*—Irving M. Weiner; Pamela S. Austin

[57] ABSTRACT

In a system of overhead projection there is provided a horizontal stage on which is to be placed an object to be imaged. Means for illuminating the object is mounted below the stage at an angle thereto, while a projection lens system is installed above the stage and parallel thereto, in such a position that the axis of the light from the illumination means passes at an angle through its center. A mirror mounted above the lens system projects the undistorted image of the object onto a vertical screen. In another system of overhead projection based on the same principles, the stage and the projection lens system are inclined relative to the illumination means while themselves kept parallel to each other. The axis of the light from the illumination means in this instance extends vertically upwardly and passes at an angle through the center of the lens system. There are further disclosed herein some overhead projectors constructed in accordance with these systems of the invention.

21 Claims, 17 Drawing Figures

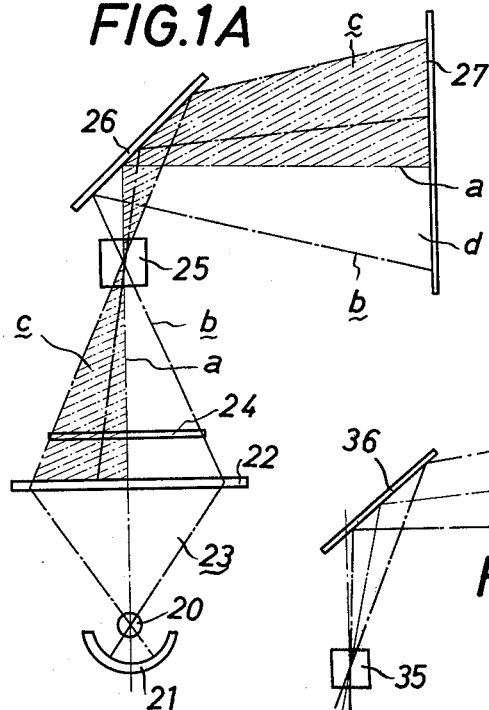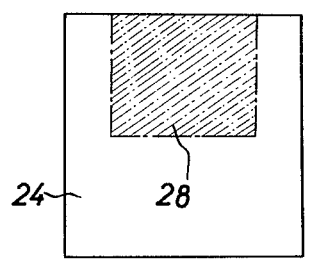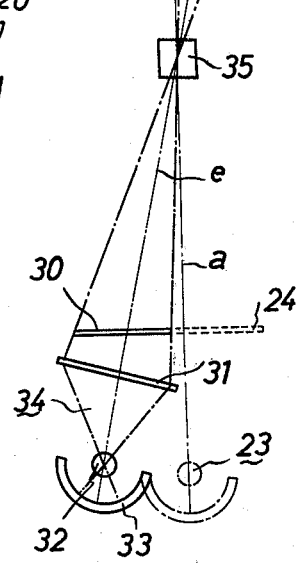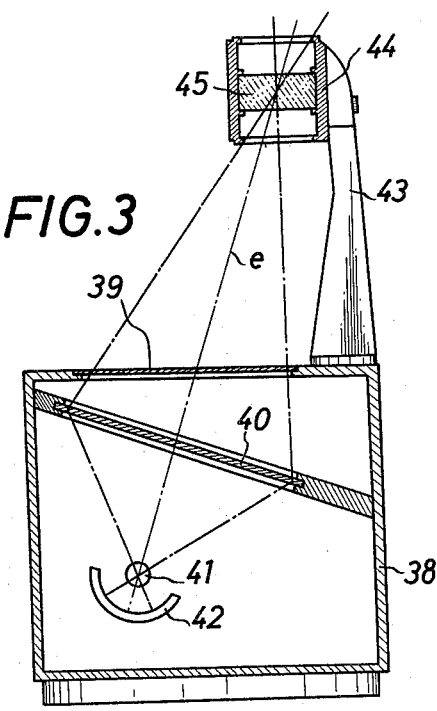

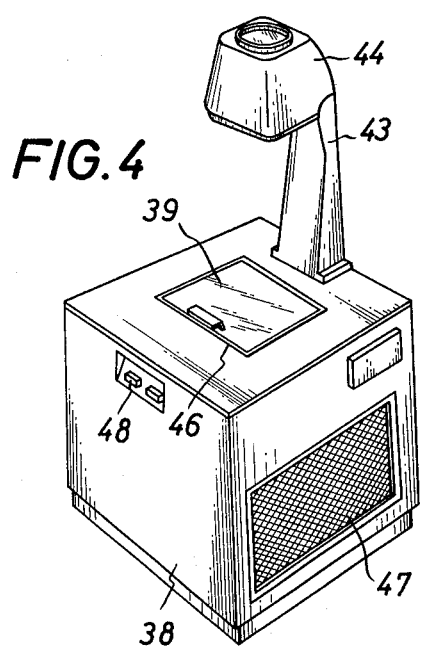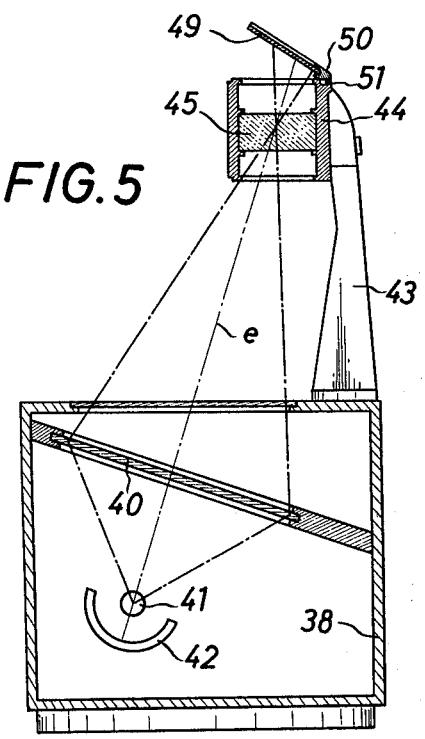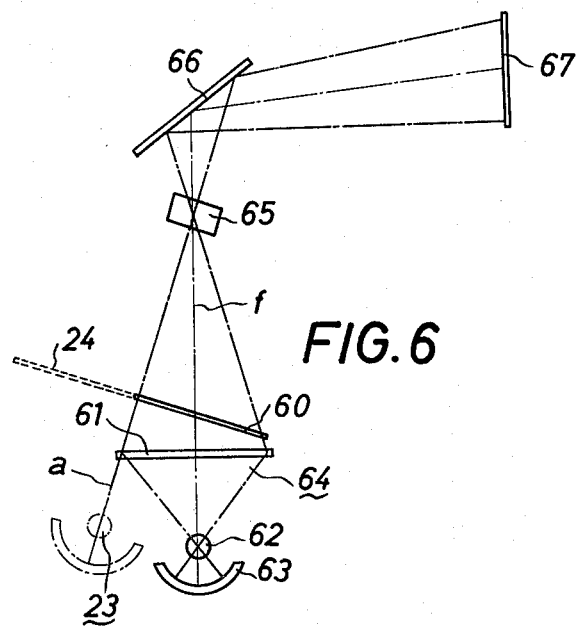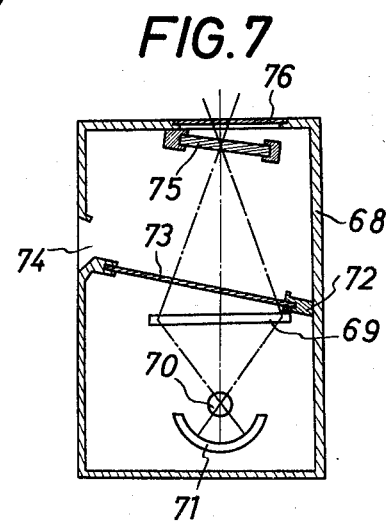

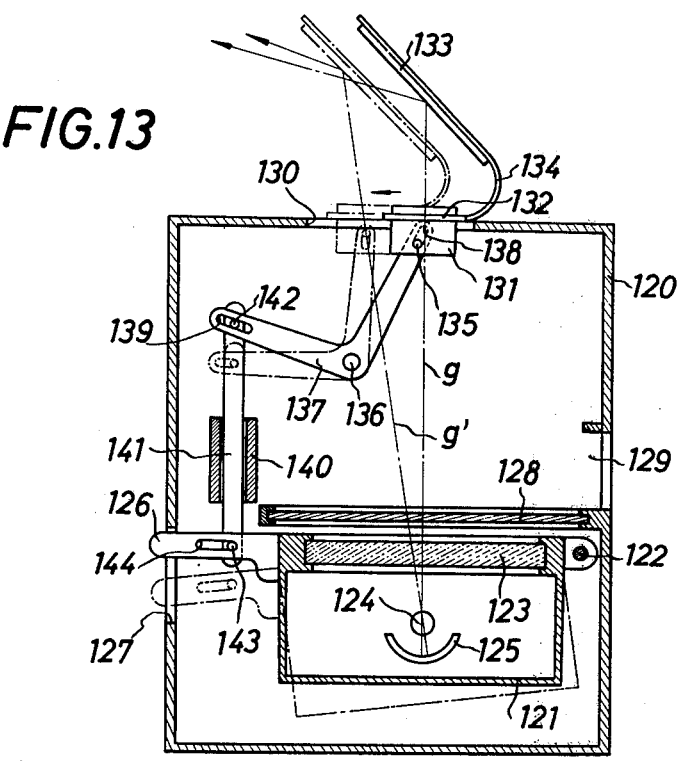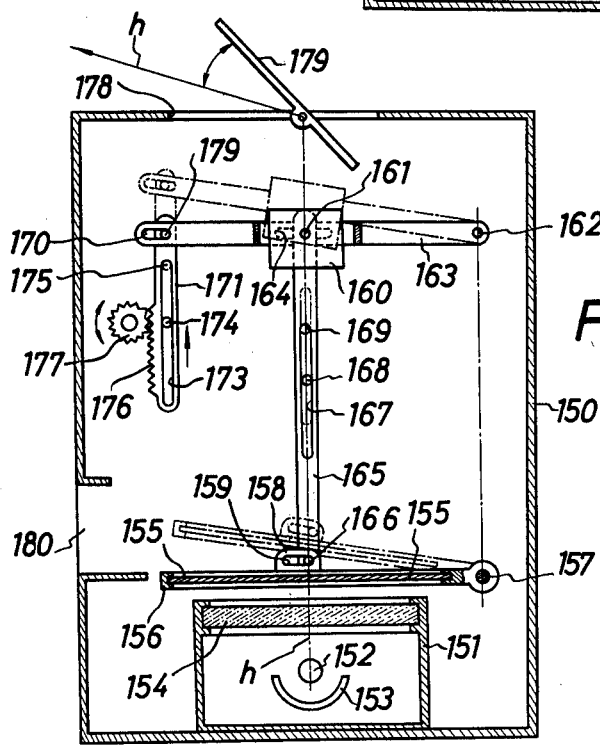

SYSTEM AND DEVICE FOR OVERHEAD PROJECTION

This invention relates to overhead projectors. More specifically, the invention relates to novel and improved systems of overhead projection designed to form an undistorted image on a vertical surface or screen, and to overhead projectors constructed on the bases of such systems.

BACKGROUND OF THE INVENTION

In prior overhead projectors of comparable design, a stage for a slide or transparency to be imaged, means including a source of light and a condenser for illuminating the slide or transparency, and a projection lens system to form the image have been mostly installed parallel to each other. The axis of the light from the illumination means passes through the respective centers of the stage and the projection lens system at right angles, and is directed toward a screen by an inclined mirror above the lens system. In case the screen is installed vertically, however, the image produced thereupon is inevitably distorted into the shape of a trapezoid, tapering toward the lower end. This distortion has so far been compensated for by mounting the screen out of the perpendicular.

Such an inclined screen does not provide a favorable view of the image being projected thereupon, especially to an audience of many persons. This is a critical drawback to the prior overhead projectors, as these are principally designed for such large audiences in clasrooms, auditoriums, assembly rooms, and other halls or rooms of various establishments. Particularly in rooms or theaters with amphitheatrical seat arrangement, it must be a toil indeed for those in the rearward seats to watch the inclined screen for an extended length of time.

Accordingly, it is an object of the present invention to provide a novel and improved system of overhead projection whereby an undistorted image of a transparency of slide (hereinafter simply referred to as a "transparency" to mean any such picture or like material adapted for projection in an overhead projector) can be formed on a vertical surface or screen (hereinafter simply referred to as a "screen").

SUMMARY OF THE INVENTION

The present invention provides a projection system including a stage on which an object to be imaged is placed, and illumination means for the object disposed on one side of the stage. The projection lens system is disposed on the opposite side of the stage and has a predetermined optical axis. The projection lens system is so positioned that the axis of light from the illumination means passes through the center of the projection lens system at an angle relative to the predetermined optical axis of the projection lens system. A mirror is provided for projecting the image of the object onto a surface. The projection lens system is disposed beteen the stage and the mirror.

The invention also provides a projector including a casing, and a stage on which an object to be imaged is placed and said stage being supported by the casing. Ilumination means for the object is disposed on one side of the stage and the illumination means is disposed within the casing. A projection lens system is disposed on the opposite side of the stage and has a predetermined optical axis. The projection lens system is so positioned that the axis of light from the illumination means passes through the center of the projection lens system at an angle relative to the predetermined optical axis of the projection lens system.

In an embodiment of the invention, there is provided a system of overhead projection wherein a projection lens system and a stage for a transparency are parallel to each other, while illumination means below the stage is at an angle thereto, so that the axis of the light from the illumination means passes at an angle through the center of the lens system. Thus passing through the lens system, and reflected by a mirror thereabove, the image is formed on a vertical screen without any substantial distortion.

The invention also provides a system of overhead projection wherein a projection lens system and a stage are parallel to each other and both inclined relative to illumination means therebelow, so that the axis of the light therefrom extends vertically upwardly and passes at an angle through the center of the lens system. The image formed in this manner on a vertical screen is also undistorted.

The invention also provides some novel and improved overhead projectors constructed in accordance with the systems referred to. The invention also provides an overhead projector to which a mirror for projecting an image onto a screen may be provided either as an integral part or separately as auxiliary equipment. The invention also provides an overhead projector wherein the mirror is turnable in both directions for some extra effects in image projection. The invention also provides an overhead projector which can be easily built into a counter, table, desk, or other articles for semipermanent service. The invention also provides an overhead projector which forms an undistorted image either on a vertical or an inclined screen.

The invention also provides an overhead projector wherein illumination means mounted within the casing is adjustable between horizontal and inclined conditions, while a projection lens system received in the top of the casing is horizontally slidable in step with the movement of the illumination means, so that the axis of the light therefrom passes at right angles through the center of the lens system when the illumination means is horizontal, and obliquely when the same is inclined. An undistorted image can be formed on an inclined screen in the former instance, and on a vertical screen in the latter. A mirror for image projection may be mounted with the lens system for sliding movement therewith.

The invention also provides an overhead projector wherein a projection lens system and a stage, which are mounted parallel to each other, are both adjustable interrelatedly between horizontal and inclined conditions with their parallel relationship unchanged, while illumination means is fixedly mounted therebelow with the axis of the light therefrom oriented vertically upwardly through the projections lens system. A mirror which may be adjustably mounted on the casing projects an undistorted image onto a vertical screen when the lens system and the stage are inclined, and onto an inclined screen when they are horizontal.

BRIEF DESCRIPTION OF DRAWINGS

FIGS. 1A and 1B illustrate a prior art system of overhead projection by way of clarification of the principles of this invention, A being a schematic side view of the prior system, and B an explanatory plan view of a stage in the system.

FIG. 2 is a schematic side view explanatory of a system of overhead projection in accordance with the principles of the present invention.

FIG. 3 is a schematic side sectional view, partly in elevation, of an overhead projector constructed in accordance with the system in FIG. 2.

FIG. 4 is a perspective view of the overhead projector of FIG. 3.

FIG. 5 is a schematic side sectional view, partly in elevation, of a modified example of the overhead projector of FIGS. 3 and 4.

FIG. 6 is a schematic side view explanatory of another system of overhead projection in accordance with the pinciples of the invention.

FIG. 7 is a schematic side sectional view of an overhead projection constructed in accordance with the system of FIG. 6.

FIG. 13 is a schematic side sectional view of a further embodiment of the invention; and FIG. 14 is a schematic side sectional view of yet a further embodiment of the invention.

Figure 8:
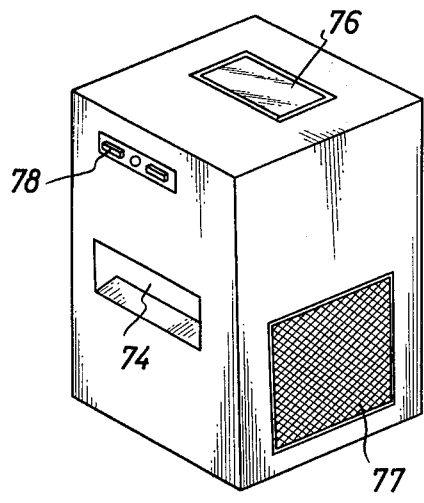
FIG. 8 is a perspective view of the overhead projector of FIG. 7.

For the clearer appreciation of the fundamental principles of this invention, it is considered essential that a conventional system of overhead projection be shown and described at some length. In a typical example illustrated in FIGS. 1A and B of the accompanying drawings, a lamp 20 of suitable type is provided right above a concave reflector 21, while a condenser 22 such as a Fresnel lens is mounted above the lamp so that the axis $a$ of the light emitted by the lamp and gathered by the reflector passes through the center of the condenser at right angles. All these elements constitute, in combination, illumination means generally indicated by numeral 23.

Above the condenser 22 a stage 24 is mounted parallel thereto, on which stage is to be placed a transparency, not shown, to be imaged. A projection lens system 25, usually consisting of two double convex lenses and a single double concave lens, is provided further above the stage 24, and a mirror 26 is suitably mounted with the lens system to project the image onto a screen 27 installed perpendicular to the plane of the horizon. The stage 24 and the lens system 25 are so arranged that the axis $a$ passes through their respective centers at right angles.

For the projection of the image onto the vertical screen 27 by this system of overhead projection, the mirror 26 must be installed at an angle of elevation of 45°. As previously stated, however, a lower half $d$ of the image being projected, that is, the part of the image between the axis $a$ and a dot-and-dash line $b$ as seen in the drawing, will be formed smaller on the screen. In order to eliminate the resultant distortion of the image, only its hatched upper half $c$ may be projected onto the screen. In this manner a distortion-free image can always be presented to the view of the observer. Such an image is obtainable if there is provided a transparency which covers only a hatched part 28 of the stage 24 of the prior system as indicated in FIG. 1B, thus eliminating the undesired part $d$ of the image being projected and permitting only the "effective" part $c$ thereof to be formed on the screen.

A system of overhead projection based on this novel concept is illustrated schematically in FIG. 2. Instead of the illumination means 23 and stage 24 of the prior arrangement, which are indicated by dotted lines in the drawing, illumination means 34 and stage 30 in accordance with this invention are arranged as indicated by solid lines. the stage 30 is formed by only a part of the stage 24 of the prior system, while the illumination means 34 is installed at a suitable angle to the horizontal stage 30, the illumination means including condenser 31 such as a Fresnel lens, a lamp or some suitble source of light 32 (hereinafter simply referred to as the "light source"), and a reflector such as a concave mirror 33, which are so arranged that the axis $e$ of the light passes through the center of the condenser at right angles.

Above the stage 30, a projection lens system 35, which may be of the known combination of one double concave lens sandwiched between two double convex lenses, is provided parallel thereto, in such a position that both the axis $e$ and the aforesaid axis $a$ of the light from the illumination means 23 of the prior arrangement pass centrally therethrough. It should be noted that the lens system 35 lies on the imagined axis $a$. An inclined mirror 36 is mounted above the lens system to reflect the rays of light coming from the latter to a vertically installed screen 37 for image formation.

In this manner, the axis $e$ of the light from the illumination means 34 passes at an angle through the stage 30 and a transparency mounted thereupon, which is not shown, and then at the same angle through the center of the projection lens system 35. Since the projection lens system is mounted horizontally, the rays of light from the illumination means 34 enter the same from its bottom, left-hand side and emit from the top, right-hand side thereof, as viewed in FIG. 2, with the image inverted. The inclined mirror 36 projects the image onto the screen 37. The image produced on the screen in this manner is free from any substantial distortion. It will be understood that, because of the way the light passes through the projection system 35 and the desired compactness of the overall projector design, the lens system should have a large diameter and a short focal length.

FIGS. 3 to 5 illustrate some overhead projectors based on the above described system of FIG. 2. FIGS. 3 and 4, first of all, show an example to which the mirror 36 of FIG. 2 may be provided as auxiliary equipment. A cooling fan, means for holding a transparency mounted on the stage, electrical equipment, and other usual components of overhead projectors in general are not shown in FIG. 3, the better to illustrate the essential elements of the invention. A transparent stage 39 is built in the top of a substantially rectangular casing 38, within which a condenser 40, a light source 41, and a reflector 42 are arranged like their equivalents illustrted in FIG. 2. On the casing 38, a stem 43 stands upwardly to support a housing 44, which preferably is removable and in which is mounted a projection lens system 45 having a large diameter and a short focal length as previously mentioned. This projection lens system must be so positioned that the axis *e* of the light from the illumination means within the casing passes at a suitable angle through its center, as referred to in connection with FIG. 2.

In FIG. 4, which shows the same overhead projector in perspective, there are illustrated a frame 46 for holding a transparency, not shown, on the stage 39, a suitably netted opening 47 for ventilation purposes, and switches 48 for on-off control of the light source, cooling fan, or the like. With the overhead projector of this construction, a mirror may typically be suspended from or directly mounted on a ceiling at a specified angle to project the image onto a separately vertically installed screen. The angle of inclination of the illumination means, the distance between the illumination means and the projection lens system, the distance between the projection lens system and the mirror, and the angle of inclination of the mirror, are all determined interrelatedly, in conformity with the system of overhead projection illustrated in FIG. 2.

This type of overhead projector may most suitably be installed for semipermanent service in classrooms, auditoriums, assembly rooms, and other rooms and halls or various establishments, with the mirror and the screen mounted separately in their predetermined positions. It is an advantage that the absence of the mirror from immediately above the lens housing 44 provides a favorable view of the screen to the audience.

In another example of overhead projector shown in FIG. 5, which also is based on the system of FIG. 2, a mirror 49 supported by a holder 50 on the lens housing 44 is pivotally mounted on a shaft or pin 51 so as to be turnable to some extend in both directions. In this manner the image being projected onto the screen can be moved in either direction to produce some extra effects.

FIG. 6 illustrates another system of overhead projection, in which a stage 60 and illumination means 64 are arranged as in the drawing relative to the stage 24 and the illumination means 23 of the conventional arrangement shown by the dotted lines in the same drawing, in order to obtain the "effective" part *c* of the image described in relation with FIG. 2. In other words, instead of the illumination means 34 in the overhead projection system of FIG. 2, the stage 60 and a projection lens system 65 are inclined relative to the illumination means 64 while being kept parallel to each other. The illumination means 64 includes a horizontally extending condenser 61, a light source 62, and a reflector 63.

More specifically, the stage 60 is formed by approximately one half of the stage 24 of the conventional arrangement, so to say, as divided by the imagined axis *a* of the light from the conventionally arranged illumination means 23 passing at right angles through its center. The projection lens system 65 is installed parallel to the inclined stage 60, and in such a position that the imagined axis *a* passes at right angles through its center and that a vertically extending axis *f* of the light from the illumination means 64 passes obliquely through the center. Since the lens system 65 is inclined relative to the illumination means 64 as aforesaid, the rays of light from the latter enter the same from the bottom, right-hand side and emit from the top, left-hand side, as viewed in FIG. 6. The rays of light from the illumination means 64 pass through the stage 60, a transparency mounted thereupon, which is not shown, and the projection lens system 65, and are reflected by an inclined mirror 66 toward a vertically installed screen 67 to form the undistorted image of the transparency thereupon.

Figure 9:
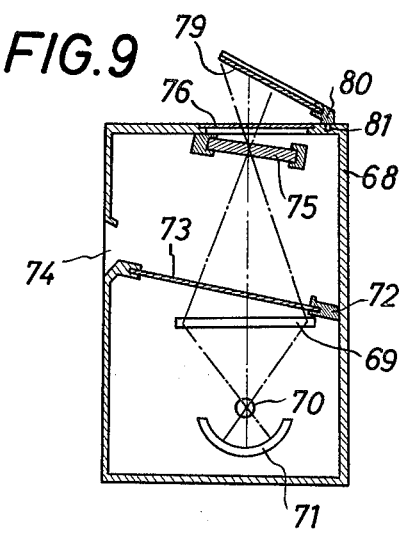
FIG. 9 is a partial schematic side sectional view of a modified example of the overhead projector of FIGS. 7 and 8.

FIGS. 7 to 9 illustrate some practical examples of overhead projector based on the above described system of FIG. 6. Referring first to FIG. 7, in which a cooling fan, means for holding a transparency upon a stage, electrical equipment, and other usual components of overhead projectors not essential to this invention are not shown, there is provided a casing 68 of substantially rectangular, vertically elongated shape. Within this casing a condenser 69 is installed horizontally, with a light source 70 and a reflector 71 therebelow. An inclined, transparent stage 73 is supported by a frame 72 immediately above the condenser 69. A slot or opening 74 for insertion and removal of a transparency, not shown, into and out of the casing is formed through its front wall so as to be open to the elevated edge of the stage 73. Above the stage 73, a projection lens system 75, which may be of the aforementioned combination of two double convex lenses and one double concave lens, is mounted parallel thereto. The top of the casing is partly opened to permit the emission of the light from the projection lens system. This opening may be closed with a transparent sheet 76 of glass or other suitable material to protect the lenses against damage and dust formation.

The same overhead projector is illustrated in perspective in FIG. 8, in which are additionally shown a netted opening 77 for ventilation purposes, and switches 78 for on-off control of the light source, cooling fan, or the like.

With this type of overhead projector, too, to which a mirror is provided as an attachment like the embodiment of FIGS. 3 and 4, the mirror may typically be suspended from or directly mounted on the ceiling at a prescribed angle above the projection lens system 75 within the casing, to reflect the light emitting therefrom onto a separately vertically installed screen. Also like the embodiments of FIGS. 3 to 5, the angle of inclination of the stage and the lens system, the distance between the illumination means and the lens system, the distance between the lens system and the mirror, and the angle of inclination of the mirror, are all determined relative one another, in accordance with the basic system of FIG. 6. This overhead projector is also fit for semipermanent service in classrooms, auditoriums, assembly rooms, and the like, with the mirror and the screen installed in their prescribed positions. It provides an uninterrupted view of the screen because the mirror is installed separately and because the casing dispenses with the upwardly extending stem and the lens housing shown in the embodiments of FIGS. 3 to 5.

A modification of the overhead projector of FIGS. 7 and 8 is partly shown in FIG. 9, in which, like the embodiment of FIG. 5, an inclined mirror 79 supported by a holder 80 above the transparent sheet 76 on the casing 68 is prvotally mounted on a shaft or pin 81 so as to be turnable in both directions through a limited angle. Thus, the image being projected onto the screen may be moved in either direction to produce some extra effects.

The system of overhead projection described with reference to FIGS. 2 and 6 are both adaptable, for instance, in exhibition of any pertinent information to customers in various commercial establishments, as illustrated by way of example in FIG. 10. In a hall or room 90 of a commercial establishment such as, for instance, a bank, a screen 92 is formed on a wall 91 behind the clerks, not shown, while a mirror 94 is mounted on a ceiling 93 at a predetermined angle, with its front surface 95 partly facing the screen and its back concealed from the view of the customers by a fixture 96 of appropriate shape which may be formed substantially integral with the ceiling.

Figure 12:
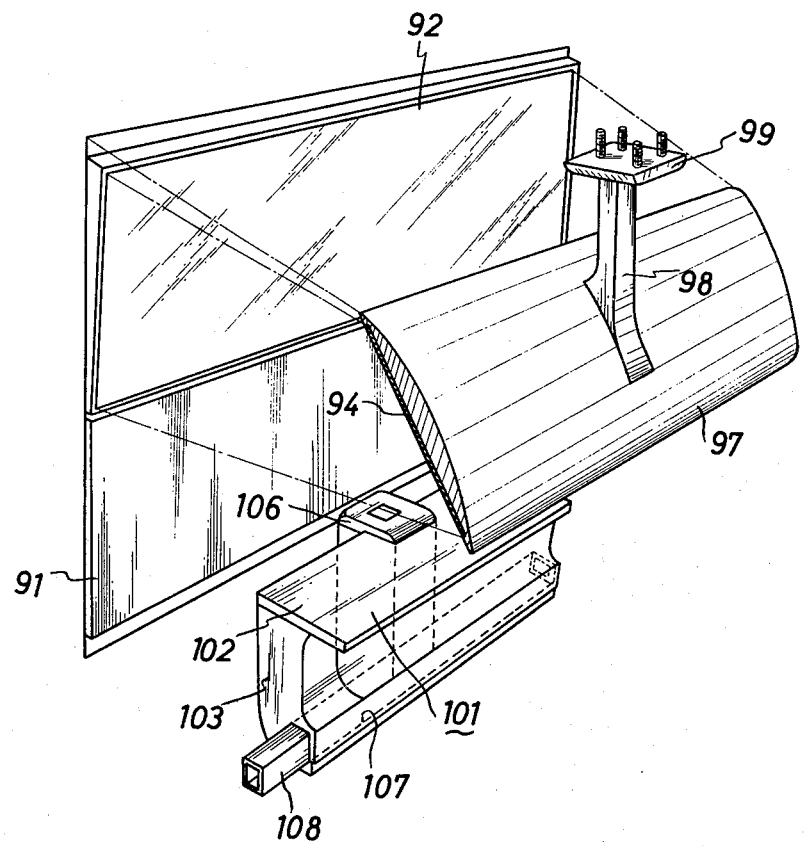
FIG. 12 is a perspective view showing an application of the overhead projector of the invention similar to that of FIG. 10.

The mirror 94 may also be supported by a simpler, and perhaps less expensive, means shown in FIG. 12. As illustrated, the mirror is securely held by back cover 97 which is provided with a substantially integral post 98. This post has an expanded top 99 to be bolted to the ceiling.

Referring back to FIG. 10, both the screen 92 and the mirror 94 are horizontally elongated, and two counter units 101 of matching overall length, each having one overhead projector built in it, are installed side by side on the floor 100. (Shown in FIG. 12 is only one counter unit having a single overhead projector, with the screen and mirror formed in matching length.)

Figure 10:
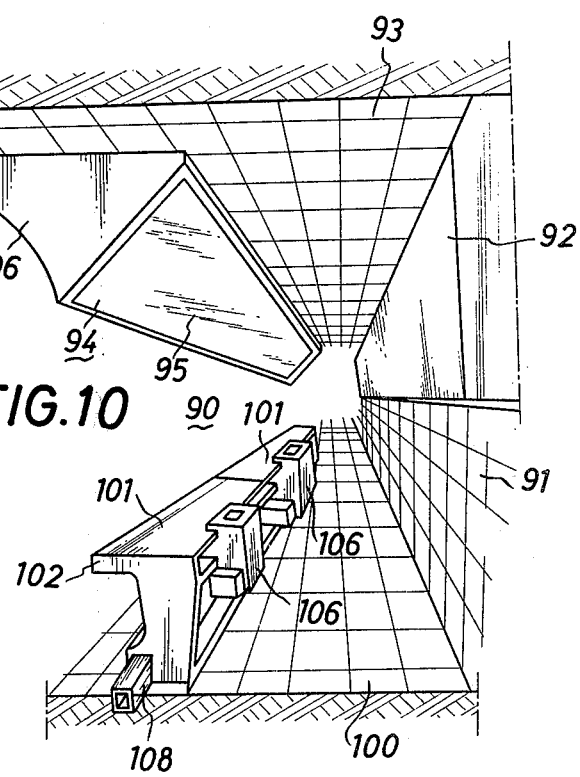
FIG. 10 is a perspective view showing one application of the overhead projectors of the invention, in which the projectors are each built in a counter unit for semipermanent service in a commercial establishment.
Figure 11A:
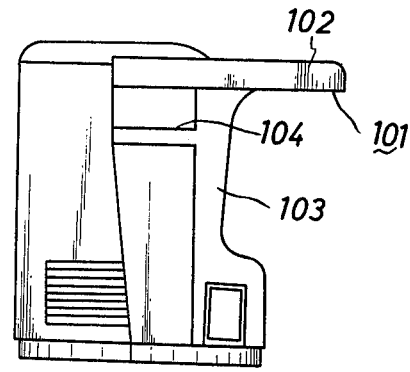
FIGS. 11A, B and C illustrate in greater detail one of the counter units with the built-in overhead projector shown in FIG. 10, A being a side elevational view, B a top plan view, and C a front view thereof.
Figure 11B:
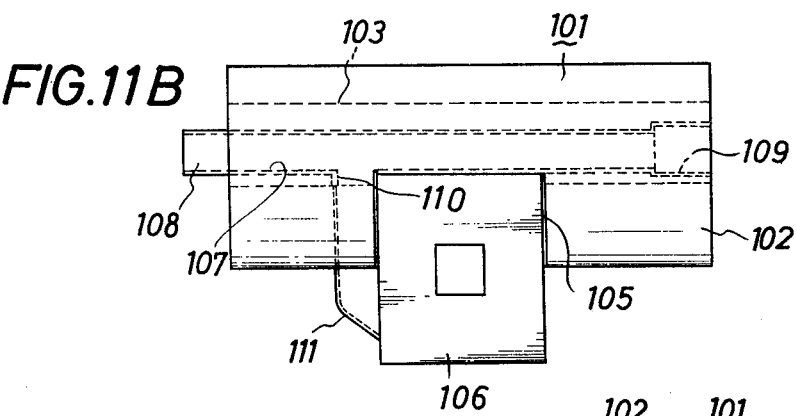
Figure 11C:
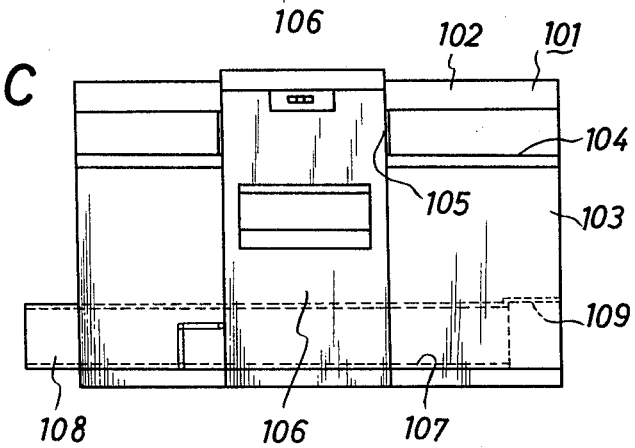

One of the counter units shown in FIG. 10 is illustrated in greater detail in FIG. 11. The counter unit 101 may be of ordinary construction, typically comprising a top 102, a leg portion 103, and a shelf 104. The projector casing is built into the counter at 105. The overhead projector 106 shown in FIGS. 10 and 12 is of the type illustrated in FIGS. 7 and 8, although the one illustrated in FIGS. 3 and 4 is adaptable as well. A passage 107 for exhausting heated air out of the projector casing runs lengthwise through the counter unit, with a connective duct or pipe 108 extending outwardly from one end. At the other end, there is formed a wider portion 109 for the insertion of a similar duct or pipe extending from another counter unit for communication with the passage 107 of the illustrated counter unit 101. In this manner, any desired number of such counter units may be linked together as in FIG. 10. The passage 107 has a branch 110 for communication with the interior of the projector casing through a duct or pipe 111.

It will be needless to say that the overhead projectors of this invention can be built not only in counters as shown and described in the foregoing, but in tables, desks, and many other articles only with slight modification of the attachments or accessories, without departing from the proper scope of the invention.

FIGS. 13 and 14 illustrate further embodiments of the present invention, which may be used either as overhead projectors of the prior design or, by the manual adjustment of the illumination means or of the stage and projection lens system, as those embodying the principles of this invention. In both FIGS. 13 and 14, the usual components of overhead projectors which are considered unessential for the description of these particular embodiments are not shown.

The example shown in FIG. 13 is based on the system of FIG. 2. Within a substantially rectangular casing 120, an enclosure 121 which houses the illumination means of the overhead projector is swingably supported on one side by a pin 122, the illumination means including a condenser 123, a light source 124, and a reflector 125. On the opposite side, the enclosure is coupled with a lever 126, the other end of which extends out of the casing through a vertically elongated slot 127 formed in its front wall. By the manual depression of the lever 126, the enclosure 121 will be turned downwardly on the pin 122, as indicated by the dot-and-dasy lines in the drawing, from its illustrated horizontal condition. Above the condenser 123 which is exposed from the enclosure 121, a transparent stage 128 is secured horizontally, and a slot or opening 129 for the insertion and removal of transparencies is formed adjacently through the back wall of the casing.

The top of the casing 120 is slotted at 130 to permit some sideways movement, as viewed in FIG. 13, of a lens housing 131 slidably fitten therein. The aforesaid projection lens system is encased in this housing, which is flanged at 132 so as not to drop into the casing through the slot 130. Above the lens housing 131, a mirror 133, inclined at a predetermined angle, is fixedly supported by a member 134 which is coupled to the lens housing. On one side of the lens housing within the casing 120, a pin 135 is fixedly planted which is received in a slot 138 formed at one end of a bellcrank 137 swingable on a pin 136 at the apex of the angle formed by its two arms. The bellcrank 137 is also slotted at 139 to receive a pin 142 fixedly planted at the top of a link 141 which is vertically movable guided by a member 140. Another pin 143 is secured at the lower end of the link and is received in a slot 144 formed in the aforesaid lever 126.

In the condition shown by the solid lines in FIG. 13, the overhead projector is in conventional arrangement, with the axis g of the light from the illumination means extending vertically upwardly to pass through the center of the projection lens system at right angles. A screen used with this conventional arrangement must be inclined as aforesaid to produce an undistorted image.

Upon depression of the lever 126, the enclosure 121 is turned downwardly on the pin 122, to a position indicated by the dot-and-dash lines in the drawing. The link 141 is simultaneously moved downwardly, so that, by the resultant counterclockwise turn, as viewed in FIG. 13, of the bellcrank 137 on the pin 136, the lens housing 131 together with the mirror 133 is moved along the slot 130 in the direction of the arrow, to a position also indicated by the dot-and-dash lines in the drawing. The axis g' of the light from the thus inclined illumination means passes obliquely through the center of the thus displaced projection lens system within the housing 131. An undistorted image can now be projected onto a vertically installed screen in accordance with the system of FIG. 2.

The illumination means, the projection lens system and so forth are returned to their initial conditions by manually lifting the level 126. Some mechanical means will be readily contemplated by the specialists for such upward and downward movement of the lever 126 within the scope of this invention.

FIG. 14 illustrates another embodiment of the invention which is based on the system of FIG. 6. Within a casing 150, an enclosure 151 for the illumination means is fixedly installed at the bottom, the illumination means including a light source 152, a reflector 153, and a condenser 154 supported at the top of the enclosure. Above the condenser 154, a transparent stage 155 is held in a frame 156 which is swingably supported on one side by a pin 157. Though not shown in the drawing, it is assumed that the stage 155 is equipped with means for preventing a transparency mounted thereupon from sliding down when the stage is tilted in a manner hereinafter to be described.

A member 158 stands upwardly from the middle of one side edge of the frame 156, the member 158 being slotted at 159. Above the stage 155, a lens housing 160 is mounted parallel thereto, in such a position that the vertically extending axis h of the light from the illumination means within the enclosure passes centrally therethrough. The lens housing 160 is planted with pins 161 on both sides thereof, which are received in slots 164 formed in a bifurcated middle portion of a supporting rod 163, while this rod is swingable on a pin 162 installed right above the pin 157 of the stage 155 so as to be parallel thereto. One of the pins 161 on the lens housing 160 is connected to the upper end of a link 165, at the lower end of which is planted a pin 166 received in the aforesaid slot 159 of the member 158. A comparatively long slot 167 is formed in the mid-part of the link 165, and a pair of spaced-apart pins 168 and 169, which are securely supported by means not shown in the drawing, are fitted in the slot to ensure the vertical travel of the link 165.

A slot 170 is formed at the free end of the supporting rod 163 to receive a pin 172 planted at the upper end of a rack 171, while this rack is slotted at 173 to receive a pair of spaced-apart pins 174 and 175 which are fixedly supported by means not shown in the drawing. In this manner the vertical travel of the rack 171 is ensured. Teeth 176 on one face of the rack engage a pinion 177 which may be manually rotated from the outside of the casing. It is, of course, possible to rotate the same mechanically, by a motor or some other driving means not illustrated in the drawing. The casing 150 has an opening 178 at the top, in which a mirror 179 is swingably supported so that its angle of inclination is manually adjustable. A slot or opening 180 is formed through the front wall of the casing for insertion and removal of transparencies.

In the condition illustrated by the solid lines in FIG. 14, both the stage 155 and the lens housing 160 are horizontal, so that the axis h of the light from the illumination means within the enclosure 151 passes through the centers of the stage and the projection lens system at right angles. In this arrangement the light may be projected by the mirror 179 onto an inclined screen in accordance with the prior art.

Upon counterclockwise rotation, as viewed in FIG. 14, of the pinion 177, the rack 171 is moved vertically upwardly guided by the pins 173 and 174, as indicated by the arrow in the drawing. The supporting rod 163 and the lens housing 160 are now turned upwardly on the pin 162 into their inclined condition indicated by the dot-and-dash lines. By this upward displacement of the lens housing, the link 165 coupled with one of its pins 161 is moved vertically upwardly guided by the pins 168 and 169, so that the stage 155 also is turned upwardly on the pin 157 into its inclined condition indicated by the dot-and-dash lines. The stage 155 and the projection lens system within the housing 160 are now parallel to each other in their inclined condition.

By the adjustment described in the preceding paragraph, the axis h is made to pass at an angle through the center of the projection lens system, so that now an undistorted image can be produced on a vertically installed screen in accordance with the system of FIG. 6. The projection lens system and the stage may be returned to their illustrated initial condition by the clockwise turn, as viewed in FIG. 14, of the pinion 177. The mirror 179 may be turned manually to adjust to the horizontal and inclined conditions of these members.

It will be obvious to those skilled in the art that various modifications of the present invention may be resorted to in a manner limited only by a just interpretation of the appended claims.

I claim:
1. An overhead projector comprising in combination:
a casing;
a stage on which an object to be imaged is placed and said stage being supported by said casing;
illumination means for said object disposed on one side of said stage and said illumination means being disposed within said casing;
a projection lens system disposed on the opposite side of said stage and having a predetermined optical axis;
said projection lens system being so positioned that the axis of light from said illumination means passes through the center of said projection lens system at an angle relative to said predetermined optical axis of said projection lens system, and
wherein said stage is a substantially horizontal stage within said casing, said illumination means is mounted below said stage and adjustable between horizontal and inclined conditions, said projection lens system is disposed above said stage and parallel thereto, said projection lens system being slidably received in the top of said casing and operatively connected to said illumination means in such a manner that the axis of the light therefrom passes through the center of said projection lens system at right angles when said illumination means is horizontal and obliquely when said illumination means is inclined, and including a mirror connected to said projection lens system for slidable movement therewith.

2. An overhead projector comprising in combination:
a casing;
a stage on which an object to be imaged is placed and said stage being supported by said casing;
illumination means for said object disposed on one side of said stage and said illumination means being disposed within said casing;
a projection lens system disposed on the opposite side of said stage and having a predetermined optical axis;
said projection lens system being so positioned that the axis of light from said illumination means passes through the center of said projection lens system at an angle relative to said predetermined optical axis of said projection lens system; and
wherein said stage is a substantially horizontal stage within said casing, said illumination means is contained within an enclosure below said stage, said enclosure being swingable between horizontal and inclined conditions, said projection lens system being disposed within a housing above said stage and parallel thereto, said housing being slidably received in the top of said casing and operatively connected to said enclosure in such a manner that the axis of the light from said illumination means passes through the center of said projection lens system at right angles when said enclosure is horizontal and obliquely when said enclosure is inclined, and including means for simultaneously actuating said enclosure and said housing, and a mirror mounted on said housing for slidable movement therewith.

3. An overhead projector comprising in combination:

a casing;

a stage on which an object to be imaged is placed and said stage being supported by said casing;

illumination means for said object disposed on one side of said stage and said illumination means being disposed within said casing;

a projection lens system disposed on the opposite side of said stage and having a predetermined optical axis;

said projection lens system being so positioned that the axis of light from said illumination means passes through the center of said projection lens system at an angle relative to said predetermined optical axis of said projection lens system; and wherein said stage is a substantially horizontal stage within said casing on which is to be placed said object to be imaged through an opening formed in said casing and including an enclosure swingable between horizontal and inclined conditions below said stage, said illumination means including a condenser built in the top of said enclosure, a source of light below said condenser, and a reflector below said source of light; said source of light and said reflector being both contained within said enclosure and so arranged that the axis of the light therefrom passes through the center of said condenser at right angles, said projection lens system being disposed within a housing above said stage and parallel thereto, said housing being slidably received in a slot formed in the top of said casing and operatively connected to said enclosure in such a manner that said axis of the light passes through the center of said projection lens system at right angles when said enclosure is horizontal and obliquely when said enclosure is inclined, and including means for simultaneously actuating said enclosure and said housing, and a mirror mounted on said housing for slidable movement therewith.

4. A projector according to claim 3, wherein said enclosure below said stage is supported on one side by a pin for swinging movement between horizontal and inclined conditions and which is connected on the other side with a lever extending out of said casing; and including a system of linkage between said housing and said lever wherby, upon actuation of said lever, said housing is moved in step with said enclosure so that said axis of the light passes through the center of said projection lens system at right angles when said enclosure is horizontal and obliquely when said enclosure is inclined.

5. An overhead projector comprising in combination:

a casing;

a stage on which an object to be imaged is placed and said stage being supported by said casing;

illumination means for said object disposed on one side of said stage and said illumination means being disposed within said casing;

a projection lens system disposed on the opposite side of said stage and having a predetermined optical axis;

said projection lens system being so positioned that the axis of light from said illumination means passes through the center of said projection lens system at an angle relative to said predetermined optical axis of said projection lens system, and wherein said stage is disposed within said casing and is adjustable between horizontal and inclined conditions, said illumination means being fixedly mounted below said stage, the axis of the light from said illumination means extending substantially vertically upwardly, said projection lens system being disposed above stage and parallel thereto, said projection lens system being adjustable between horizontal and inclined conditions in step with said stage while being kept parallel thereto, said axis of light passing through the center of said projection lens system at right angles when said projection lens system is disposed substantially horizontally, and including means for simultaneously actuating said stage and said projection lens system, and a mirror received in an opening at the top of said casing.

6. A projector according to claim 5, wherein said illumination means is contained within an enclosure fixedly mounted below said stage, said projection lens system being disposed within a housing above said stage and parallel thereto, said housing being adjustable between horizontal and inclined conditions in step with said stage while being kept parallel thereto, said axis of light passing through the center of said projection lens system at right angles when said housing is horizontal, and including means for simultaneously actuating said stage and said housing.

7. An overhead projector comprising in combination:

a casing;

a stage on which an object to be imaged is placed and said stage being supported by said casing;

illumination means for said object disposed on one side of said stage and said illumination means being disposed within said casing;

a projection lens system disposed on the opposite side of said stage and having a predetermined optical axis;

said projection lens system being so positioned that the axis of light from said illumination means passes through the center of said projection lens system at an angle relative to said predetermined optical axis of said projection lens system; and wherein said stage is disposed within said casing on which is to be placed said object to be imaged through an opening formed in said casing, said stage being adjustable between horizontal and inclined conditions, said illumination means including a condenser built in the top of a stationary enclosure below said stage, a source of light below said condenser, and a reflector below said source of light; said source of light and said reflector being both contained within said enclosure and so arranged that the axis of the light therefrom extends substantially vertically upwardly through the center of said condenser, said projection lens system being disposed within a housing above said stage and parallel thereto, said housing being adjustable between horizontal and inclined conditions in step with said stage while being kept parallel thereto, said axis of light passing through the center of said projection lens system at right angles when said housing is horizontal, and including means for simultaeneously actuating said stage and said housing, and a mirror with an adjustable angle of inclination received in an opening at the top of said casing.

8. An overhead projector comprising in combination:

a casing;

a stage on which an object to be imaged is placed and said stage being supported by said casing;

illumination means for said object disposed on one side of said stage and said illumination means being disposed within said casing;

a projection lens system disposed on the opposite side of said stage and having a predetermined optical axis;

said projection lens system being so positioned that the axis of light from said illumination means passes through the center of said projection lens system at an angle relative to said predetermined optical axis of said proejection lens system, and wherein said stage is disposed within said casing on which is to be placed an object to be imaged through a opening formed in said casing, said stage being spported on one side by a pin for swinging movement between horizontal and inclined conditions, said illumination means including a condenser built in the top of a stationary enclosure below said stage, a source of light below said condenser, and a reflector below said source of light; said source of light and said reflector being both contained within said enclosure and so arranged that the axis of the light therefrom extends substantially vertically upwardly through the center of said condenser, said projection lens system being disposed within a housing above said stage and parallel thereto said housing being held by a rod member which is supported at one end by a pin for swinging movement between horizontal and inclined conditions, said axis of light passing through the center of said projection lens system at right angles when said housing is horizontal, and including a link between said housing and said stage whereby both are moved parallel to each other, means for vertically moving the free end of said rod member, and a mirror with an adjustable angle of inclination received in an opening at the top of said casing.

9. A projector according to claim 8, wherein said means for veritcally moving the free end of said rod member includes a rack coupled with the free end of said rod member, and a pinion meshing with the teeth of said rack.

10. A projector comprising in combination:

a casing:

a substantially horizontal stage, said stage being supported by and within said casing;

illumination means for said object disposed on one side of said stage, said illumination means being disposed within said casing and mounted below said stage, said illumination means being adjustable between horizontal and inclined conditions;

a projection lens system disposed on the opposite side of said stage and having a predetermined optical axis, said projection lens system being connected to said illumination means in such manner that the axis of the light therefrom passes through the center of said projection lens system at right angles when said illumination means is horizontal and obliquely when said illumination means is inclined, and said projection lens system being so positioned that the axis of light from said illumination means passes through the center of said projection lens system at an angle relative to said predetermined optical axis of said projection lens system; and a mirror connected to said projection lens system for slidable movement therewith.

11. A projector according to claim 10, which further includes an enclosure for said illumination means, said enclosure being swingable between horizontal and inclined conditions, a housing for said projection lens, said housing being disposed above said stage, said housing being slidably received in the top of said casing and operatively connected to said enclosure in such manner that the axis of the light from said illumination means passes through the center of said projection lens system at right angles when said enclosure is horizontal and obliquely when said enclosure is inclined, and including means for simultaneously actuating said enclosure and said housing, and said mirror is mounted on said housing for slidable movement therewith.

12. A projector according to claim 10 for overhead projection use, wherein said casing includes an opening formed therein on which is to be placed said object to be imaged, and including an enclosure swingable between horizontal and inclined conditions below said stage, said illumination means including a condenser built in the top of said enclosure, a source of light below said condenser, and a reflector below said source of light; said source of light and said reflector being both contained within said enclosure and so arranged that the axis of the light therefrom passes through the center of said condenser at right angles, said projection lens system being disposed within a housing above said stage and parallel thereto, said housing being slidably received in a slot formed in the top of said casing and operatively connected to said enclosure in such manner that said axis of the light passes through the center of said projection lens system at right angles when said enclosure is horizontal and obliquely when said enclosure is inclined, and including means for simultaneously actuating said enclosure and said housing, and said mirror is mounted on said housing for slidable movement therewith.

13. A projector according to claim 12, wherein said enclosure below said stage is supported on one side by a pin for swinging movement between horizontal and inclined conditions and which is connected on the other side with a lever extending out of said casidng; and including a system of linkage between said housing and said lever whereby, upon actuation of said layer, said housing is moved in step with said enclosure so that said axis of the light passes through the center of said projection lens system at right angles when said enclosure is horizontal and obliquely when said enclosure is inclined.

14. A projector according to claim 10, for overhead projection use, wherein said stage is adjustable between horizontal and inclined conditions, said illumination means being fixedly mounted below said stage, the axis of the light from said illumination means extending substantially vertically upward, said projection lens system being adjustable between horizontal and inclined conditions in step with said stage while being kept parallel thereto, said axis of light passing through the center of said projection lens system at right angles when said projection lens system is disposed substantially horizontally, and including means for simultaneously actuating said stage and said projection lens system, and said mirror is received in an opening at the top of said casing.

15. A projector according to claim 14, wherein said illumination means is contained within an enclosure fixedly mounted below said stage, said projection lens system being disposed within a housing above said stage and parallel thereto, said housing being adjustable between horizontal and inclined conditions in step with said stage while being kept parallel thereto, said axis of light passing through the center of said projection lens system at right angles when said housing is horizontal, and including means for simultaneously actuating said stage and said housing.

16. A projector according to claim 10 for overhead projection use, wherein an object to be imaged is placed on said casing through an opening formed therein, said stage being adjustable between horizontal and inclined conditions, said illumination means including a condenser built in the top of a stationary enclosure below said stage, a source of light below said condenser, and a reflector below said source of lights; said source of light and said reflector being both contained within said enclosure and so arranged that the axis of the light therefrom extends substantially vertically upwardly through the center of said condenser, said projection lens system being disposed within a housing above said stage and parallel thereto, said housing being adjustable between horizontal and inclined conditions and step with said stage while being kept parallel thereto, said axis of light passing through the center of said projection lens system at right angles when said housing is horizontal, and including means for simultaneously actuating said stage and said housing and said mirror has an adjustable angle of inclination and is received in an opening at the top of said casing.

17. A projector according to claim 10 for overhead projection use, wherein an object to be imaged is disposed on top of said casing through an opening formed therein, said stage being supported on one side by a pin for swinging movement between horizontal and inclined conditions, said illumination means including a condenser built in the top of a stationary enclosure below said stage, a source of light below said condenser, and a reflector below said source of light; said source of light and said reflector being both contained within said enclosure and so arranged that the axis of the light therefrom extends substantially vertically upwardly through the center of said condenser, said projection lens system being disposed within a housing above said stage and parallel thereto, said housing being held by a rod member which is supported at one end by a pin for swinging movement between horizontal and inclined conditions, said axis of light passing through the center of said projection lens system at right angles when said housing is horizontal, and including a link between said housing and said stage whereby both are moved parallel to each other, means for vertically moving the free end of said rod member, and a mirror with an adjustable angle of inclination received in an opening at the top of said casing.

18. A projector according to claim 17, wherein said means for vertically moving the free end of said rod member includes a rack coupled with the free end of said rod member, and a pinion meshing with the teeth of said rack.

19. An overhead projector comprising in combination:
a casing;
a stage on which an object to be imaged is placed and said stage being supported by said casing;
illumination means for said object disposed on one side of said stage, said illumination means being disposed within said casing, said illumination means being angularly disposed with respect to said stage;
a projection lens system disposed on the opposite side of said stage and having a predetermined optical axis, said projection lens system being parallel to said stage;
said projection lens system being so positioned that the axis of light from said illumination means passes through the center of said projection lens system and at an angle relative to said predetermined optical axis of said projection lens system;
said stage is an inclined stage within said casing, said illumination means being mounted below said stage, the axis of light from said illumination means extending substantially vertically upwardly, said projection lens system being disposed above said stage, said projection lens system being so positioned that said axis of light passes at an angle through the center thereof, and said casing being at least partly opened at the top to permit the emission of the light through said projection lens system; and
said stage is an inclined stage within said casing on which is to be placed said object to be imaged through a slot formed in said casing, said illumination means including a condenser mounted substantially horizontally below said stage, a source of light below said condenser, and a reflector being so arranged that the axis of the light therefrom, passes through the center of said condenser at right angles, and said casing being formed with an opening at the top to permit the emission of the light through said projection lens system.

20. A projector according to claim 19, wherein said slot is open to the elevated edge of said stage.

21. A projector according to claim 19, wherein said opening is closed with a sheet of transparent material.

* * * * *

UNITED STATES PATENT OFFICE
CERTIFICATE OF CORRECTION

Patent No. 4,002,408      Dated January 11, 1977

Inventor(s) Michito Amma

It is certified that error appears in the above-identified patent and that said Letters Patent are hereby corrected as shown below:

On the title page, the left column, on the line following "[21] Appl. No.: 205,832" insert the following:

--[30]    Foreign Application Priority Data
     Oct. 14, 1971    Japan.................. 46-94810
     Oct. 14, 1971    Japan.................. 46-94811
     Oct. 14, 1971    Japan.................. 46-94812 --.

Signed and Sealed this

Twenty-ninth Day of March 197

[SEAL]

Attest:

RUTH C. MASON
*Attesting Officer*

C. MARSHALL DANN
*Commissioner of Patents and Trademar*